J. SCHRANKEL.
ROTARY-BROILER.

No. 173,503. Patented Feb. 15, 1876.

Witnesses:
Chas. J. Buchheit
C. N. Woodward

John Schrankel, Inventor
by Edward Wilhelm, Atty

UNITED STATES PATENT OFFICE.

JOHN SCHRANKEL, OF LANCASTER, NEW YORK.

IMPROVEMENT IN ROTARY BROILERS.

Specification forming part of Letters Patent No. 173,503, dated February 15, 1876; application filed January 25, 1876.

*To all whom it may concern:*

Be it known that I, JOHN SCHRANKEL, of Lancaster, in the county of Erie, and State of New York, have invented certain new and useful Improvements in Rotary Broilers, which improvements are fully set forth in the following specification, reference being had to the accompanying drawing.

My invention relates to a revolving broiler, composed of two disks or circular frames mounted on a horizontal shaft, so that the meat or other article to be broiled is presented edgewise to the fire, the two disks being made adjustable with reference to each other, so as to clamp the meat or other article to be broiled between them, or to recede from each other for releasing the article after being broiled, as will be hereinafter more fully described.

Figure 1:
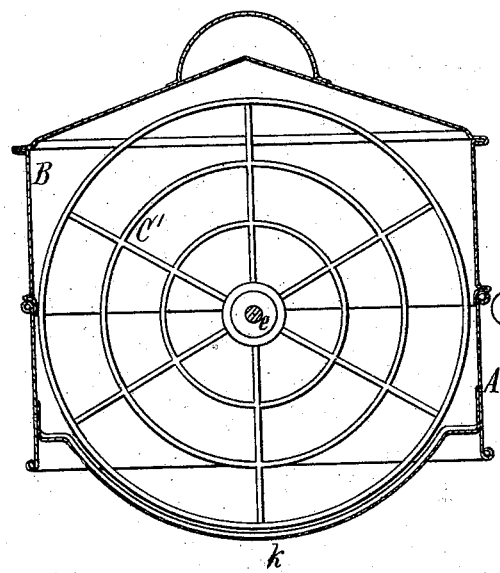
Figure 2:
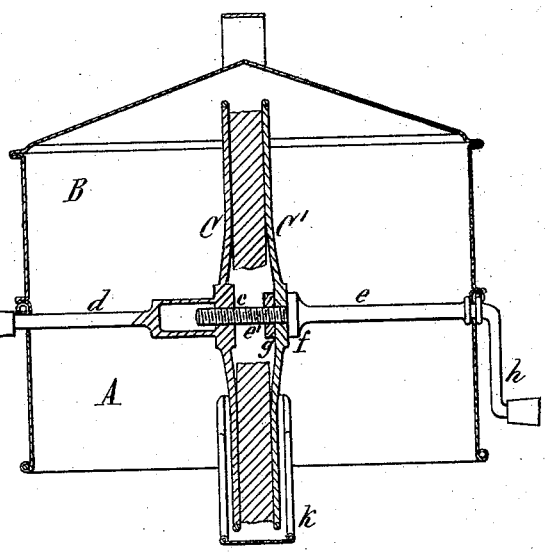
Figure 3:
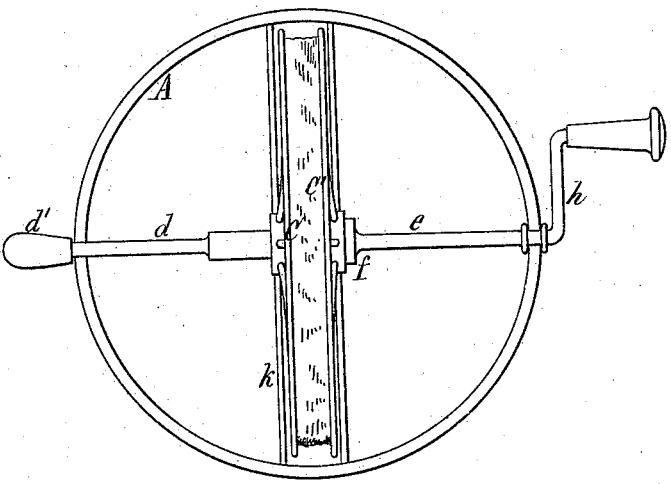

In the accompanying drawing, Figure 1 is a side elevation of my improved broiler with the outer case in section; Fig. 2 is a vertical section at right angles to Fig. 1; Fig. 3 is a plan-view of the apparatus with the cover removed.

Like letters of reference refer to like parts in each of the figures.

A represents the lower part of the inclosing cylindrical casing of the apparatus, provided with slots or bearings in which the shaft of the broiler turns. B represents the upper part or cover of the casing, fitting tightly in the lower part, A. C C′ represent the two disks or circular frames between which the article to be broiled is clamped. They are composed of radial ribs or arms and concentric rings, formed of wire, or cast in one piece of malleable iron, or constructed in any other suitable manner.

The disk C is secured to the inner end of a shaft, $d$, its outer end projecting through the casing A, and carrying a handle, $d'$. The hub of the disk C is provided with an axial bore or socket, $c$, having an internal screw-thread, as clearly represented in the drawing. The disk C is mounted loosely on a shaft, $e$, the inner end of which is formed by a screw, $e'$, engaging in the threaded socket $c$ of the disk C. The disk C′ is held on the shaft $d$, between a collar $f$ and screw-nut $g$, so as to turn freely on the shaft. The latter is provided on its outer end with a hand-crank $h$. $k$ represents a curved deflector or shield secured to the lower portion A of the casing below the disks C C′, as clearly shown in the drawing.

Upon removing the broiler from the inclosing case, the two disks C C′ are readily separated by seizing the handle $d'$ with one hand and turning the crank $h$ with the other hand, so as to unscrew the screw $e'$ from the socket $c$. The meat or other article to be broiled is then arranged on the disk or frame C, when the other disk C′ is screwed down upon it, so as to firmly secure and clamp it between the two disks. The disk C′, being mounted loosely on the shaft $e$, remains stationary after coming in contact with the meat or other article placed between the disks, while the rotation of the shaft $e$ and screw $e'$ continues until the article is properly clamped. When this is accomplished the disks are arranged with their shafts in the slots or bearings of the case A, when the cover B is applied and the apparatus placed upon the hole of the cooking-stove. By slowly turning the crank $h$ all parts of the meat or other article are brought successively over the fire and thoroughly cooked or broiled, the deflector $k$ preventing the outer edge of the meat from being overdone. The slow rotary motion of the meat, in a plane at right angles to the axis on which it rotates, prevents the fat or juice from running to the circumference or edge of the meat and dripping off, but causes them to travel in concentric curves around the center, thereby retaining the meat in a more juicy state than could be accomplished by the broilers heretofore in use. The meat is presented edgewise to the fire, and in consequence cooked simultaneously on both sides, whereby the operation is greatly expedited.

When the meat has been cooked to the desired degree the cover B is raised and the broiler removed, when by unscrewing the disk C′ the meat is released. The handle $d'$ and crank $h$ being outside of the casing, remain cold during the operation of broiling, thereby permitting the ready disengagement of the clamping-disks, while in ordinary broilers the device or means for fastening the meat to the broiler is generally applied to the parts to which the meat is secured, and becomes so hot during the cooking operation as to seriously interfere with the handling of the parts.

My improved broiler is very durable and produced at comparatively small expense, while the parts thereof are readily cleaned when taken apart.

What I claim as my invention is—

1. A rotary broiler composed of two vertical clamping disks or frames mounted on a horizontal shaft, and adapted to approach each other as described, so that the articles to be broiled are presented edgewise to the fire and cooked on both sides simultaneously, substantially as and for the purpose hereinbefore set forth.

2. The combination of the disk C, provided with shaft $d$ and threaded socket $c$, with the disk C' mounted on the shaft $e$, provided with screw $e'$, for adjusting the disks towards and from each other in clamping and releasing the article to be broiled, substantially as and for the purpose hereinbefore set forth.

3. The combination, with the case A B, of the rotary clamping-disks C C', shaft $d$ $e$, handle $d'$, crank $h$, and shield $k$, substantially as and for the purpose hereinbefore set forth.

JOHN SCHRANKEL.

Witnesses:
 EDWARD WILHELM,
 CHARLES BUCHHEIT.